United States Patent
Nishikawa et al.

(10) Patent No.: US 8,941,885 B2
(45) Date of Patent: Jan. 27, 2015

(54) IMAGE PROCESSING APPARATUS AND IMAGE PROCESSING METHOD

(75) Inventors: Hiromitsu Nishikawa, Tokyo (JP); Akira Shibasaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/879,926

(22) PCT Filed: Oct. 4, 2011

(86) PCT No.: PCT/JP2011/005594
§ 371 (c)(1),
(2), (4) Date: Apr. 17, 2013

(87) PCT Pub. No.: WO2012/053153
PCT Pub. Date: Apr. 26, 2012

(65) Prior Publication Data
US 2013/0201501 A1  Aug. 8, 2013

(30) Foreign Application Priority Data

Oct. 20, 2010  (JP) ................. 2010-235561

(51) Int. Cl.
H04N 1/04 (2006.01)
G06K 15/02 (2006.01)
G03G 15/01 (2006.01)
G03G 15/10 (2006.01)
H04N 1/52 (2006.01)

(52) U.S. Cl.
CPC ........ G06K 15/1878 (2013.01); G03G 15/0126 (2013.01); G03G 15/105 (2013.01); H04N 1/52 (2013.01)
USPC ........... 358/3.26; 358/3.24; 358/1.9; 358/505

(58) Field of Classification Search
USPC ................. 358/3.26, 3.24, 1.9, 505
See application file for complete search history.

(56) References Cited

U.S. PATENT DOCUMENTS

| | | | | |
|---|---|---|---|---|
| 7,006,253 B2 * | 2/2006 | Fuchigami et al. | ............ | 358/2.1 |
| 2009/0190193 A1 * | 7/2009 | Sato | ............................ | 358/505 |

FOREIGN PATENT DOCUMENTS

| | | |
|---|---|---|
| CN | 103038065 A | 4/2013 |
| JP | 6-222646 A | 8/1994 |
| JP | 2004-181688 A | 7/2004 |
| JP | 2006-177797 A | 7/2006 |
| JP | 2006-272934 A | 10/2006 |
| JP | 2008-126453 A | 6/2008 |
| JP | 2008-143135 A | 6/2008 |
| JP | 2008-149514 A | 7/2008 |
| JP | 2010-023291 A | 2/2010 |
| JP | 2010-137471 A | 6/2010 |

* cited by examiner

*Primary Examiner* — Houshang Safaipour
(74) *Attorney, Agent, or Firm* — Canon USA, Inc., IP Division

(57) ABSTRACT

An image processing apparatus includes a conversion unit configured to convert image data corresponding to a pixel of interest in an image into color material data corresponding to a color material amount of a chromatic color material, and a generation unit configured to generate color material data corresponding to a color material amount of an achromatic color material at the pixel of interest in such a manner that the color material data corresponding to the color material amount of the achromatic color material at the pixel of interest is different from color material data corresponding to a color material amount of the achromatic color material at a pixel adjacent to the pixel of interest.

13 Claims, 21 Drawing Sheets

IMAGE PROCESSING APPARATUS AND IMAGE PROCESSING METHOD

TECHNICAL FIELD

The present invention relates to processing for determining a color material amount of a chromatic color material and a color material amount of an achromatic color material corresponding to image data.

BACKGROUND ART

Widely used types of ink for inkjet recording apparatuses are a dye ink, which contains dye as a color material, and a pigment ink, which contains pigment as a color material. Forming an image on a recording medium using a pigment ink leads to a phenomenon of coloring of specular reflection light, which is light reflected by the formed image. For example, when an image formed by this kind of recording apparatus is placed under a light source such as a spotlight, although the spotlight emits achromatic light, this light turns into colored specular reflection light after being reflected on the recording medium.

Especially, in a color image, specular reflection light tends to be colored magenta on a region with a cyan ink laid on a large part of the region, while specular reflection light tends to be colored yellow on a monochrome image as a whole. Further, such coloring of specular reflection light tends to change in an iridescent manner according to a change in an ink amount depending on regions in an image. Occurrence of this coloring of specular reflection light results in deterioration of the image quality due to a difference between the color of the specular reflection light and the color of the diffused light.

Now, a method of evaluating coloring of specular reflection light (Japanese Patent Application Laid-Open No. 2006-177797) will be described with reference to FIG. 1. A measurement sample 101 is irradiated with light by a light source 102 from a predetermined angle, and the specular reflection light reflected by the measurement sample 101 is detected by a light receiver 103. The light receiver 103 detects tristimulus values XxYxZx in the International Commission on Illumination (CIE) XYZ color system. The a*b* in the CIE L*a*b color system is calculated based on a difference between the detected XxYxZx and the tristimulus values XxYxZx of a sample that does not cause bronzing (for example, a black polished glass plate on which the wavelength dispersion of the reflective index is small). Color saturation C*, which is expressed by this a*b*, indicates the degree how much the specular reflection light is colored. Less colored specular reflection light outputs low C*, and, for example, the value of C* becomes zero for a sample that does not cause coloring of specular reflection light (in other words, C* is positioned on the origin point on the a*b* plane). Bronzing and thin-film interference are known as reasons that specular reflection light is colored as mentioned above.

Bronzing is a phenomenon that occurs due to wavelength dependency of reflection on an interface of a formed image. It is known that each ink has a unique color to which the color of the ink is changed by a bronzing phenomenon. For example, specular reflection light is colored magenta on an image region formed with a cyan ink. A main cause of a bronzing phenomenon is wavelength dependency of reflection on an interface between an air layer and an ink layer. Therefore, there is known a method reducing bronzing by further discharging a yellow ink after forming an image to cover the image region formed with a cyan ink or a magenta ink, which have relatively high wavelength dependency, with a yellow ink, which has comparatively low wavelength dependency (Japanese Patent Application Laid-Open No. 2004-181688). This patent literature further discusses that the discharge amount of a yellow ink is relatively reduced in the range of hue angles 180 degrees to 360 degrees (the hue region from cyan to magenta) in the L*a*b space.

However, the method of Japanese Patent Application Laid-Open No. 2004-181688 results in a reduction in the color gamut, if a yellow ink is applied to cover and overcoat the region from cyan to blue to magenta in the L*a*b space where a cyan ink and a magenta ink are largely used. Especially, yellow is in a complementary color relationship with blue, and therefore blue is subject to a striking reduction in the color gamut thereof. On the other hand, reducing the discharge amount of a yellow ink is effective to maintain the color gamut, but instead induces a noticeable bronzing phenomenon.

Another possible measure against coloring of specular reflection light is a method of using an achromatic color material, which is an ink containing no color material, as a recording agent with which an image is overcoated. The degree of bronzing is indicated by tristimulus values, and an achromatic color material has extremely small tristimulus values. In addition, a transparent achromatic color material does not affect color development. Therefore, use of an achromatic color material is expected to more effectively reduce coloring of specular reflection light without sacrificing the color gamut.

However, overcoating an image with use of an achromatic color material results in a change in coloring of specular reflection light according to the ink amount of the achromatic color material (achromatic color material amount), since a thin-film interference occurs due to an optical path difference of reflected light between the upper layer and the lower layer of the achromatic color material layer. FIG. 2 is a graph constructed by overcoating a solid surface of a cyan ink with an achromatic color material while changing the color material amount of the achromatic color material, evaluating the coloring of specular reflection light at this time with use of the method discussed in Japanese Patent Application Laid-Open No. 2006-177797, and then plotting the evaluation results on the a*b* plane. The numerical values on the graph of FIG. 2 indicate the achromatic color material amount. This graph shows that the coloring of specular reflection light reflected by the solid surface of the cyan ink is located in the magenta hue under the influence of bronzing, and the coloring is rotated in the clockwise direction on the a*b* plane according to an increase in the achromatic color material amount. In other words, overcoating a chromatic color material with an achromatic color material does not necessarily reduce coloring of specular reflection light, and coloring varies depending on the achromatic color material amount.

Further, an experiment has revealed that coloring also varies depending on the type of a chromatic color material laid under an achromatic color material. For example, coloring caused when a predetermined amount of a clear ink is overlaid on a solid surface of a cyan ink is different from coloring caused when the same amount of the clear ink is overlaid on a solid surface of a magenta ink. This means that just uniformly overcoating a color ink with a predetermined amount of an achromatic color material cannot sufficiently reduce coloring of specular reflection light.

SUMMARY OF INVENTION

The present invention is directed to an image processing apparatus capable of reducing coloring of specular reflection light as observed comprehensively.

According to an aspect of the present invention, an image processing apparatus includes conversion means configured to convert image data corresponding to a pixel of interest in an image into color material data corresponding to a color material amount of a chromatic color material, and generation means configured to generate color material data corresponding to a color material amount of an achromatic color material at the pixel of interest in such a manner that the color material data corresponding to the color material amount of the achromatic color material at the pixel of interest is different from color material data corresponding to a color material amount of the achromatic color material at a pixel adjacent to the pixel of interest.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Exemplary embodiments of the present invention use a clear ink as the achromatic color material by way of example, to describe an example in which the present invention is applied to an inkjet printer. However, the present invention is not limited thereto, and may use clear toner as the achromatic color material if the present invention is applied to an electrophotographic printer.

In the exemplary embodiments of the present invention, inks, which are used as recording materials, are expressed by the name of the color thereof such as cyan, magenta, yellow, black, clear (achromatic or almost achromatic), red, green, and blue. Colors, data of the colors, or the hues of the colors are denoted by the initial thereof such as C, M, Y, K, CL, R, G, and B. More specifically, "C" represents the cyan color, data of the cyan color, or the hue of the cyan color. Similarly, "M" represents magenta, "Y" represents yellow, "K" represents black, "R" represents red, "G" represents green, and "B" represents blue. "CL" represents achromatic (transparent) color, or data thereof.

As will be used herein, the phrase "coloring of specular reflection light" refers to such a phenomenon that, when illumination light is emitted to an image formed on a recording medium, the reflection light has a different color from the color of the illumination light, and this term may be abbreviated to as just "coloring" or "color". A value indicating coloring, such as an a*b* value in the CIE-L*a*b* color system, is referred to as "coloring information".

Further, "area" is a smallest unit to which ON/OFF of a dot is defined. In connection of this definition, "image data" in color matching, color separation, and gamma correction, which will be described later, refers to a set of pixel data which is a processing target. Each pixel data indicates, for example, an 8-bit graduation value.

Further, "pixel data" in halftoning refers to pixel data which is a processing target itself. Halftoning converts pixel data containing a gradation value expressed by multiple bits (for example, eight bits) into pixel data (index data) containing, for example, a gradation value expressed by 4 bits. In the following description, "pixel" refers to the smallest constituent unit for which the discharge amount of the clear ink can be changed, unless otherwise indicated.

Figure 3:
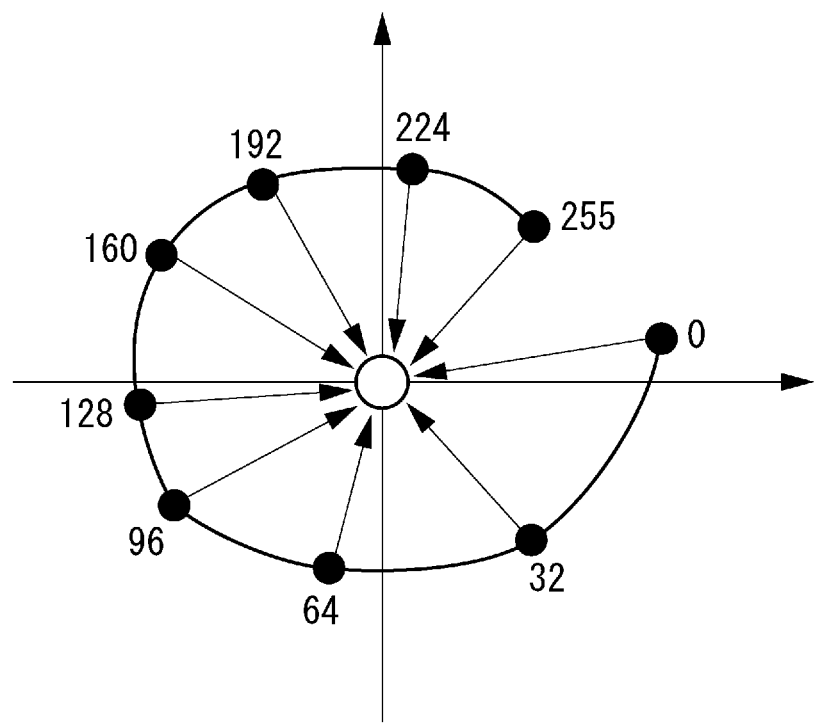
FIG. 3 schematically illustrates the principle of exemplary embodiments of the present invention.

First, the principle of the exemplary embodiments of the present invention will be described. Coloring that a human observes can be reduced by causing different coloring at each pixel. For example, consider the case where red coloring occurs at an arbitrary pixel overcoated with a predetermined amount of an achromatic color material, green coloring occurs at the next pixel overcoated with a different predetermined amount of the achromatic color material, and similarly, blue coloring occurs at the further next pixel. In this case, as illustrated in the schematic view of FIG. 3, the coloring of specular reflection light looks white according to the light's three primary colors theory (additive color mixing). In other words, local coloring phenomena of specular reflection light (for example, a combination of red, green, and blue) look white as viewed comprehensively, and therefore it appears that no coloring of specular reflection light occurs to an observer's eye.

In the above paragraph, coloring of specular reflection light has been expressed in two different manners, i.e., local coloring and comprehensive coloring, because coloring of specular reflection light depends on the observation scale. A change in coloring minute more than the resolution of a human's eye is sensed as averaged coloring. Therefore, "comprehensive coloring of specular reflection light" refers to coloring averaged in a scope that humans can resolve coloring of specular reflection light. On the other hand, "local coloring of specular reflection light" refers to coloring averaged, for example, in several 10 micrometer order size which is a scope that humans cannot resolve coloring of specular reflection light.

Figure 4:
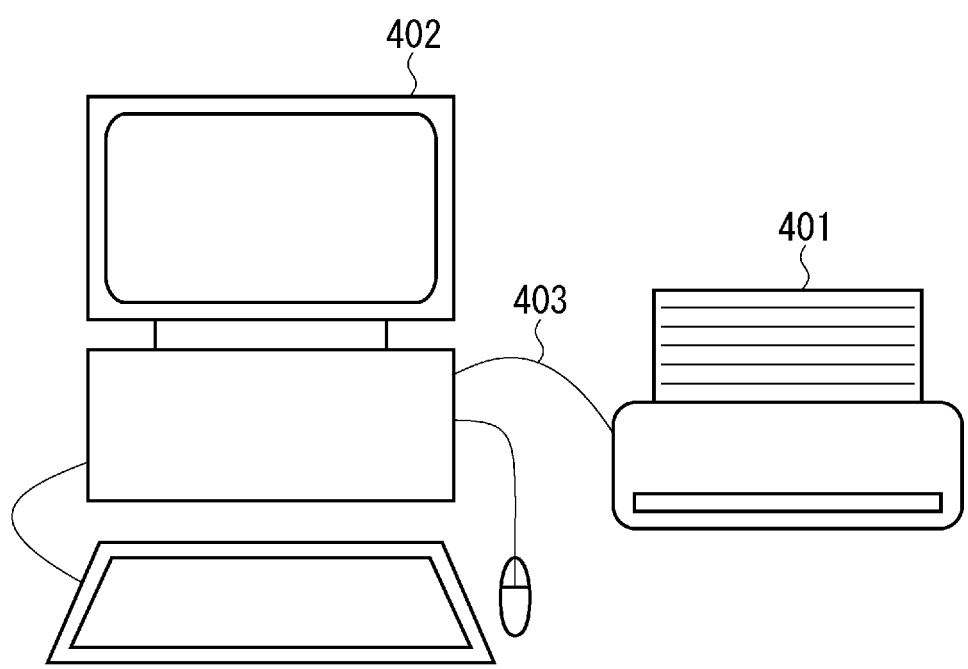
FIG. 4 illustrates an apparatus configuration of a recording data generation system according to the exemplary embodiments of the present invention.

FIG. 4 illustrates an apparatus configuration of a recording data generation system according to a first exemplary embodiment of the present invention. Referring to FIG. 4, the recording data generation system includes a printer 401, a computer system 402 provided with a printer controller and a client computer, a network cable 403, and a connector cable such as a Small Computer System Interface (SCSI) cable.

Figure 5:
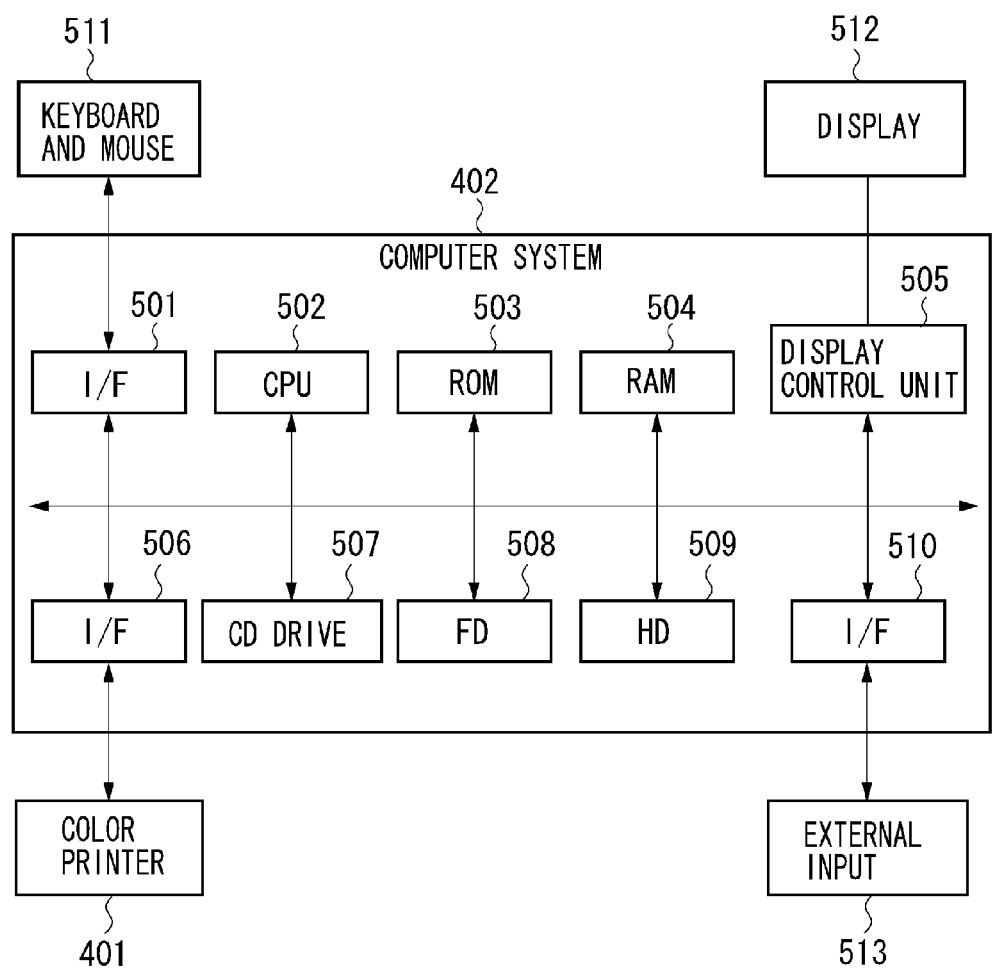
FIG. 5 illustrates a configuration of a computer system according to the exemplary embodiments of the present invention.

FIG. 5 is a block diagram illustrating a configuration of the computer system 402 illustrated in FIG. 4. Referring to FIG. 5, an interface (I/F) 501 connects a mouse and keyboard 511 with which a user inputs various instructions manually to the computer system 402. A central processing unit (CPU) 502 controls operations of the respective blocks in the computer system 402, and executes a program stored in a read only memory (ROM) 503 or a random access memory (RAM) 504. The ROM 503 preliminarily stores a program required for, for example, image processing illustrated in a flowchart which will be described below. The RAM 504 servers as a work memory to temporarily store a program that the CPU 502 uses to carry out various kinds of processing, image data that the CPU 502 processes, and results of the various kinds of processing that the CPU 502 performs. A display control unit 505 controls a display 512 which displays an image to be processed and a message to an operator. An interface (I/F) 506 connects the computer system 402 to the color printer 401. A compact disc (CD) drive 507 reads data stored in a CD (a compact disc-recordable (CD-R), a compact disc-rewritable (CD-RW), a digital versatile disc (DVD), a digital versatile disc-recordable (DVD-R), or a digital versatile disc-rewritable (DVD-RW)) which is one of external storage media, or write data thereto. A floppy disc (FD) drive 508 reads data from an FD which is one of external storage media, or writes data thereto. If, for example, a program for image processing or printer information is stored in an external storage medium such as a CD, an FD, or a DVD, these programs are installed into a hard disc (HD) 509, and are transferred to the RAM 504 when necessary. The HD 509, which serves as one of external storage media, stores a program and image data to be transferred to, for example, the RAM 504, and stores image data after various kinds of processing are applied thereto. An interface (I/F) 510 connects the computer system 402 to an external input 513 such as a modem or network card which transfers various kinds of data stored in the respective units of the computer system 402 to an external apparatus, and receives various kinds of data from an external apparatus.

Figure 6:
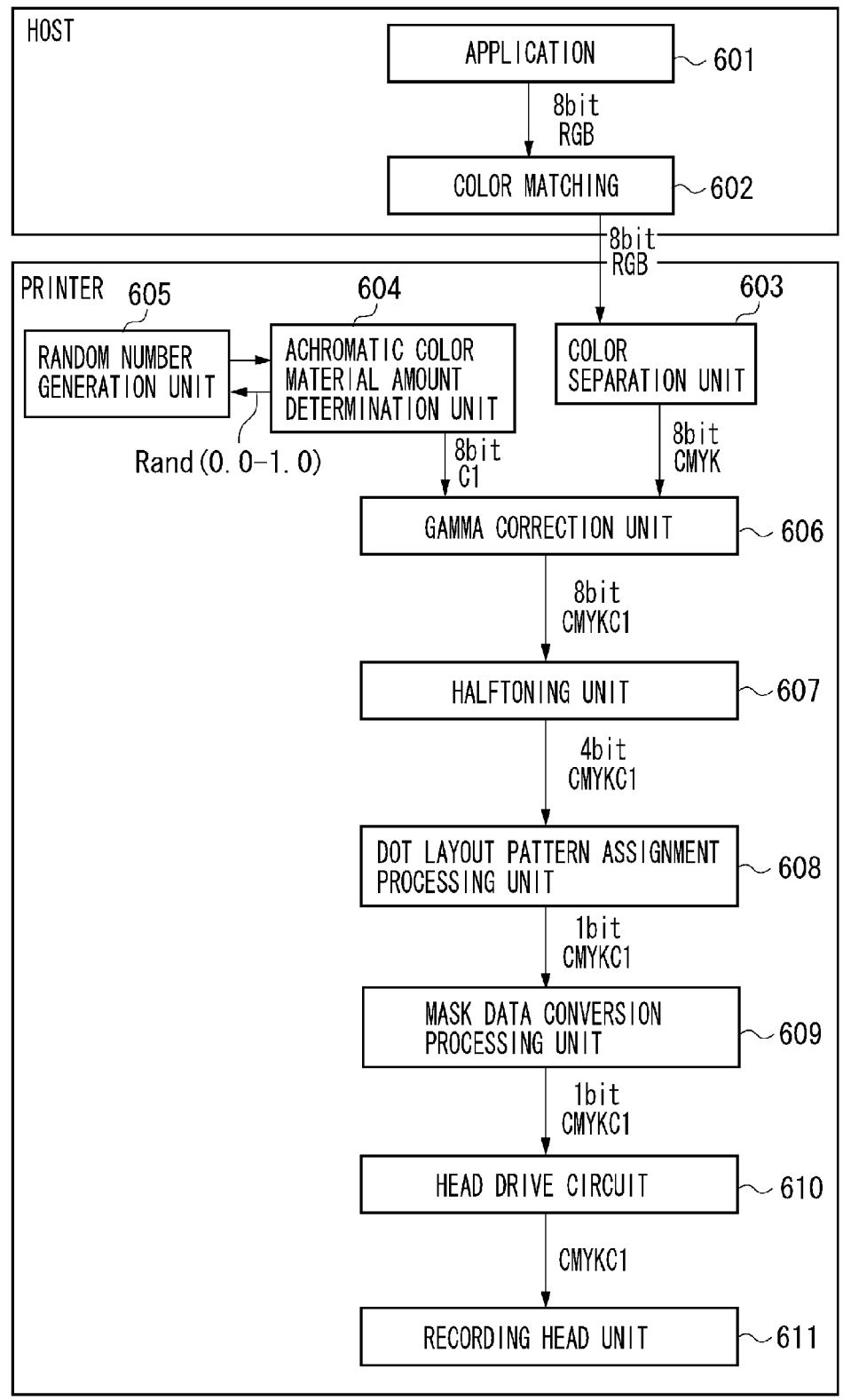
FIG. 6 illustrates functional blocks of a recording data generation system according to a first exemplary embodiment of the present invention.

FIG. 6 is a block diagram illustrating the respective functional blocks of the recording data generation system illustrated in FIG. 4. The printer 401 prints data by using a pigment ink, and uses a recording head which discharges the ink. As illustrated in FIGS. 4 and 6, the recording data generation system includes the printer 401 which uses a pigment ink, and the computer system 402 as a host apparatus or an image processing apparatus.

Next, the configuration illustrated in FIG. 6 will be described. The recording data generation system includes an application and a color conversion (color matching) as programs operable on the host apparatus. The application 601 performs the processing for generating image data to be printed by the printer 401. This image data, or image data from which print data is generated, can be introduced into the computer system 402 via various kinds of media. For example, the computer system 402 can acquire image data in the Joint Photographic Experts Group (JPEG) format, which is captured by a digital camera, from the external input 513 such as a flash memory via the I/F 510. Further, the computer system 402 can also acquire image data stored in the HD 509 and image data stored in the CD drive 507. Still further, the computer system 402 can even acquire data on a web site from the Internet via the external input 513. These acquired data pieces are displayed on the display 512, and for example, are edited and processed via the application 601. After that, the image data is converted into, for example, Red (R), Green (G), and Blue (B) image data according to the Standard Red Green Blue (sRGB) standard. Then, this image data is transferred to the color matching 602 according to a print instruction.

The color matching 602 has a three-dimensional Look Up Table (LUT) which defines the relationship for mapping the gamut reproduced by RGB image data according to the sRGB standard into the gamut reproduced by the printer 401. The color matching 602 uses this three-dimensional LUT and interpolation calculation to perform a data conversion for converting 8-bit RGB image data to an RGB image signal in the gamut of the printer 401. Alternatively, the color matching processing may be performed with use of a determinant of matrix, instead of the three-dimensional LUT. The processing of the above-described application 601 and the color matching 602 is performed by the CPU 502 according to the programs capable of realizing these functions.

Next, the printer 401 will be described. In the present exemplary embodiment, the processing of a color separation unit 603 and subsequent processing are performed within the printer 401. The printer 401 includes the color separation unit 603, an achromatic color material amount determination unit 604, a random number generation unit 605, a gamma correction unit 606, a halftoning unit 607, a dot layout pattern assignment unit 608, a mask data conversion unit 609, and a head drive circuit 610. These units operate under control of a CPU (not illustrated) constituting a control unit of the printer 401, with use of respective dedicated hardware circuits.

The color separation unit 603 converts an RGB image signal of a pixel of interest after the gamut mapping as mentioned above into color separation data of chromatic color materials such as CMYK data corresponding to the combination of inks that can reproduce the color indicated by the RGB data. In the present exemplary embodiment, this processing is performed by using the known method, i.e., the method using a three-dimensional LUT and interpolation calculation, as is the case with the color matching processing.

The achromatic color material amount determination unit 604 includes the random number generation unit 605, and determines a clear ink amount for each pixel in the image data based on a random number output from the random number generation unit 605 to determine a clear ink amount (CL) to be overlaid (used to overcoat the image) on the image. More specifically, the achromatic color material amount determination unit 604 generates color material data corresponding to a color material amount of the achromatic color material at a pixel of interest in such a manner that the color material amount of the achromatic color material at the pixel of interest is different from a color material amount of the achromatic color material at a pixel adjacent to the pixel of interest.

The random number is calculated by, for example, the following method. First, a natural random number (for example, an output value of the "RAND( )" function in C language) is calculated by, for example, the CPU, and the natural random number is divided by the maximum value to calculate a uniform random number within the range of 0 or more and 1.0 or less. Then, the uniform random number is multiplied by, for example, 255, which is the maximum number of 8-bit ink values, thereby calculating a clear ink amount for each pixel as follows.

Clear_Ink_Vol=(int)(RAND( )/RAND_MAX*255.0)    (processing 1)

In this equation, "Clear_Ink_Vol" represents a clear ink amount for each pixel, "RAND( )" represents a natural random number, and "RAND_MAX" represents the maximum value of random numbers. The random number calculated at this time is not limited to a uniform random number, and may be, for example, a normal random number varying around an 8-bit ink value of 128.

Alternatively, an output value may be generated by using mask processing of performing specific frequency modulation, such as commonly known Bayer-type mask, white-noise mask, blue-noise mask, and green-noise mask. In other words, any method may be employed as long as it can generate color material data corresponding to a color material amount of the achromatic color material at a pixel of interest in such a manner that the color material amount of the achromatic color material at the pixel of interest is different from a color material amount of the achromatic color material at a pixel adjacent to the pixel of interest.

The gamma correction unit 606 applies the known gradation value conversion to signal data of each color material in the color separation data generated by the color separation unit 603. More specifically, the gamma correction unit 606 performs such a conversion that the above-described color separation data linearly corresponds to the gradation characteristic of the printer 401 by using a one-dimensional LUT according to the gradation characteristic of each color ink of the printer 401 used in the present system. This gradation value conversion does not have to be applied to a clear ink amount determined by the achromatic color material amount determination unit 604.

The halftoning unit 607 will be described. In the following, a description will be given, assuming that the present exemplary embodiment uses four colors, C, M, Y, and K as chromatic color inks. However, the present exemplary embodiment may use six colors including light cyan (Lc) and light magenta (Lm) in addition to C, M, Y, and K. Further, the present exemplary embodiment may additionally use, for example, R, G, and B inks, and a light K ink.

Figure 7:
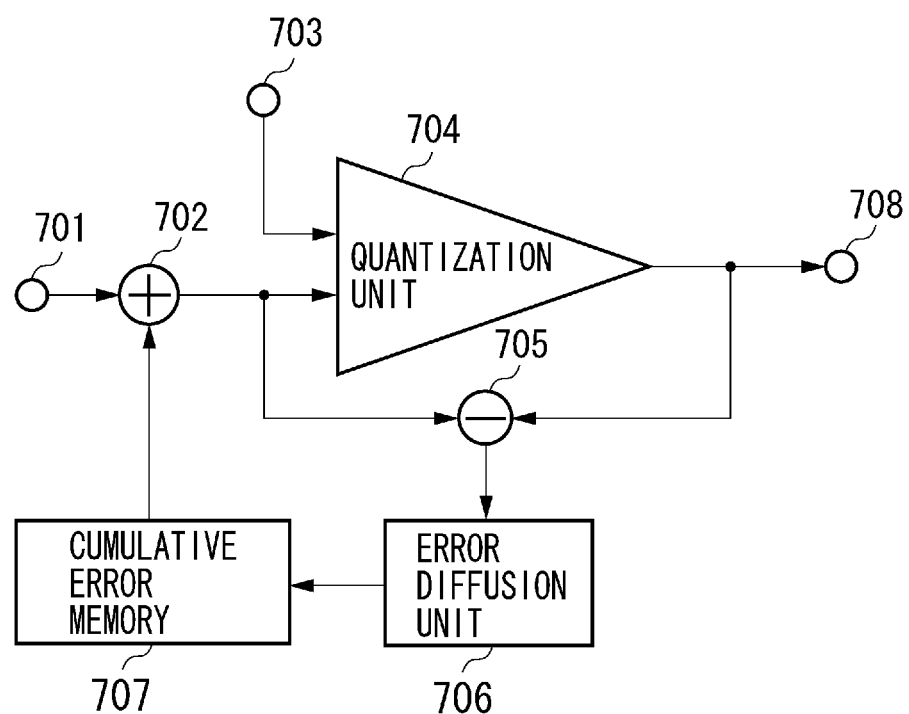
FIG. 7 is a block diagram illustrating a configuration of a halftoning unit according to the first exemplary embodiment.

FIG. 7 is a block diagram illustrating a configuration of the halftoning unit 607. Referring to FIG. 7, an input terminal 701 sequentially inputs pixel data. A cumulative error addition unit 702 adds the corresponding cumulative error to the input pixel data. A terminal 703 inputs a quantization threshold value for use in a conversion of the input pixel data into two or more number of graduation levels. A quantization unit 704 quantizes the input pixel data into multivalued data. An error calculation unit 705 calculates a quantization error. An error diffusion unit 706 diffuses the quantization error. A cumulative error memory 707 stores a cumulative error. An output terminal 708 outputs pixel data formed after the series of processing.

Figure 8:
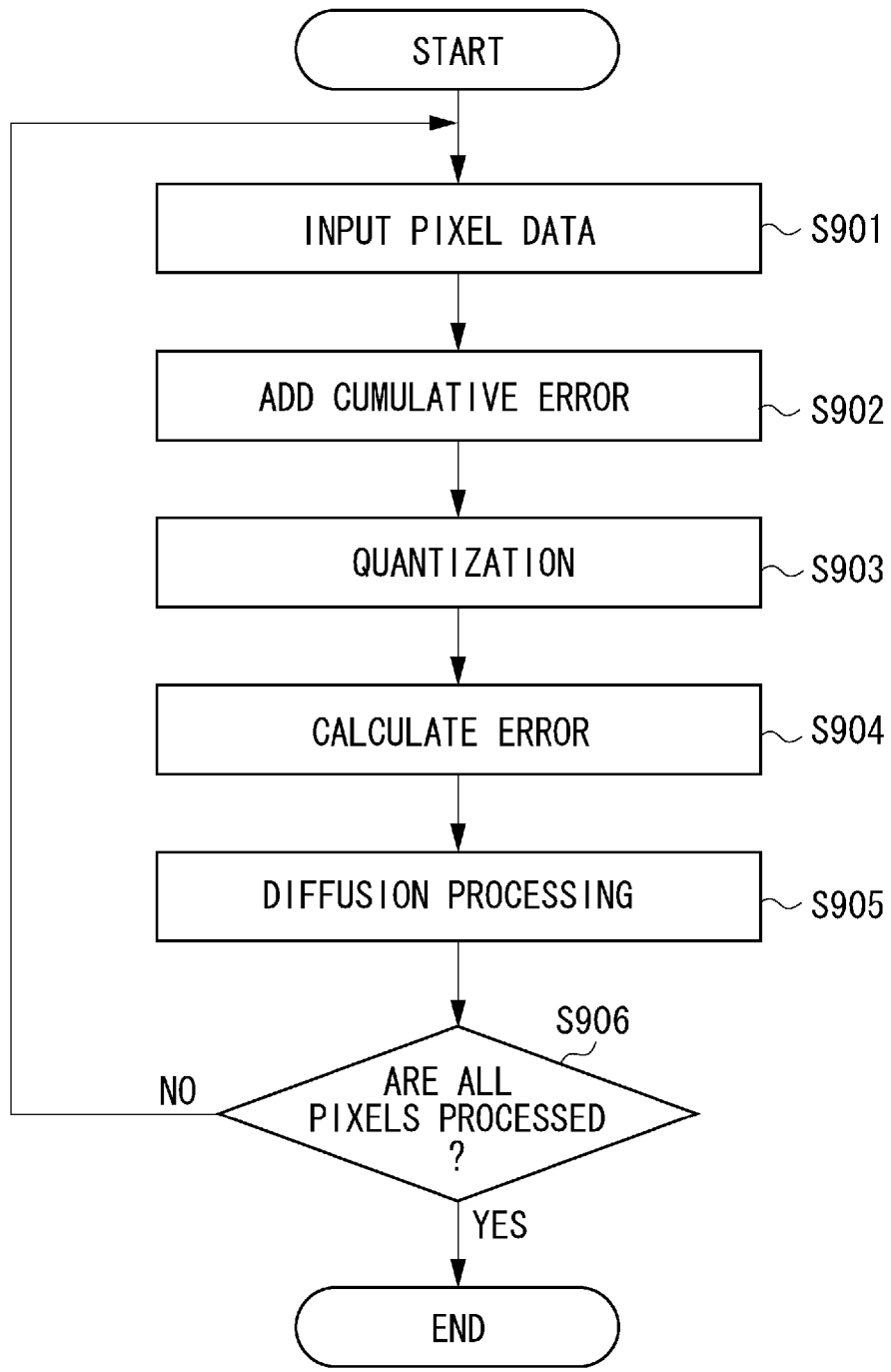
FIG. 8 is a flowchart illustrating a processing flow of the halftoning unit illustrated in FIG. 7.

The halftoning unit 607 sequentially inputs pixel data, starting from the pixel data of the uppermost and leftmost pixel in the image among pixels selected from the entire image by an image scanning unit which will be described later. The halftoning unit 607 repeatedly applies the halftoning processing to a target pixel in order while shifting the target in the direction crossing the recording medium conveyance direction. After the processing of the uppermost and rightmost pixel is completed, the target pixel is then shifted to the leftmost pixel on the next pixel row below. The processing scanning of the image is continued in this order, and is ended after completion of the processing of the lowermost and rightmost pixel which is the final pixel. FIG. 8 is a flowchart illustrating a processing flow of the halftoning unit 607.

Figure 9:
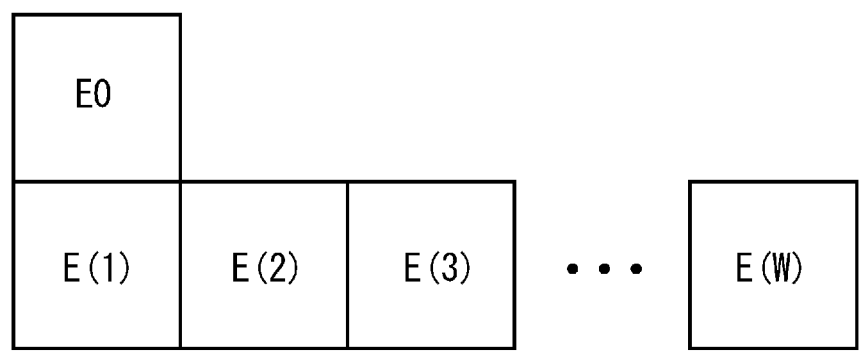
FIG. 9 illustrates what kind of data is stored in a cumulative error memory and how the data is stored in the cumulative error memory according to the first exemplary embodiment.

First, in step S901, the halftoning unit 607 inputs image data of a pixel of interest. Then, in step S902, the cumulative error addition unit 702 adds a cumulative error value corresponding to the pixel of interest which is stored in the cumulative error memory 707, to the pixel data of the pixel of interest. FIG. 9 illustrates what kind of data is stored in the cumulative error memory 707 and how the data is stored therein. The cumulative error memory 707 includes one storage area E0 and number W of storage areas E(x) (x=an integer from 1 to W). The number W represents the number of pixels in the horizontal direction of image data set as a processing target. In the cumulative error memory 707, each area stores a quantization error E(x) to be applied to a pixel of interest. The value of the quantization error is obtained by the method that will be described later, and is initialized to the initial value 0 in all areas at the begging of the processing.

In step S902, the cumulative error addition unit 702 adds the value in the error memory E(x) corresponding to the position x (0<x=<W) of the pixel in the horizontal direction, to the input pixel data. More specifically, this step is expressed by the equation I'=I+E(x), in which "I" represents pixel data input into the input terminal 701 and "I'" represents pixel data after the cumulative error addition in step S902.

In step S903, the quantization unit 704 performs quantization processing by comparing the pixel data I' after the cumulative error addition and the threshold value input by the terminal 703. In the present exemplary embodiment, the quantization unit 704 compares eight threshold values and the pixel data I' after the cumulative error addition to sort the quantized image data into any of nine levels, thereby determining the value of output pixel data to be transferred to the output terminal 708. More specifically, assuming that a value of pixel data input from the cumulative error addition unit 702 is an integer value within the range from 0 to 255, an output gradation value 0 is determined by the following equations.

$$O=0 \ (I'<16) \tag{1}$$

$$O=32 \ (16=<I'<48) \tag{2}$$

$$O=64 \ (48=<I'<80) \tag{3}$$

$$O=96 \ (80=<I'<112) \tag{4}$$

$$O=128 \ (112=<I'<144) \tag{5}$$

$$O=160 \ (144=<I'<176) \quad (6)$$

$$O=192 \ (176=<I'<208) \quad (7)$$

$$O=224 \ (208=<I'<240) \quad (8)$$

$$O=255 \ (I'>=240) \quad (9)$$

For convenience of description, the respective output gradation values O will be referred to as the following names; O=0 is referred to as level 0; O=32 is level 1; O=64 is level 2; O=96 is level 3; O=128 is level 4; O=160 is level 5; O=192 is level 6; O=224 is level 7; and O=225 is level 8.

Then, in step S904, the error calculation unit 705 calculates a difference between the pixel data I' after the cumulative error addition and the output pixel value O, i.e., a quantization error E.

$$E=I'-O \quad (10)$$

Then, in step S905, the error diffusion unit 706 performs error diffusion processing according to the horizontal position x of the pixel of interest in the following manner. The error diffusion unit 706 calculates a quantization error to be stored in the storage area E0 and E(x) according to the following processing, and stores the calculated quantization error in the cumulative error memory.

$$E(x+1)<-E(x+1)+E*7/16 \ (x<W) \quad (11)$$

$$E(x-1)<-E(x-1)+E*3/16 \ (x>1) \quad (12)$$

$$E(x)<-E0+E*5/16 \ (1<x<W) \quad (13)$$

$$E(x)<-E0+E*8/16 \ (x=1) \quad (14)$$

$$E(x)<-E0+E*13/16 \ (x=W) \quad (15)$$

$$E0<-E*1/16 \ (x<W) \quad (16)$$

$$E0<-0 \ (x=W) \quad (17)$$

Then, the error diffusion processing is ended for one pixel input to the input terminal 701.

In step S906, the halftoning unit 607 determines whether the processing of steps S901 to S906 is applied to all of the pixels in the image. If there is any pixel left to be processed (NO in step S906), the halftoning unit 607 sets the next pixel in the direction indicated by the arrow as a pixel of interest, and the processing returns to step S901. If the halftoning unit 607 determines that all of the pixels are processed (YES in step S906), then the halftoning processing is ended. This processing is performed for each ink.

Next, the dot layout pattern assignment unit 608 will be described. The above-described halftoning processing reduces the level number of multivalued density information of 256 values (8-bit data) to gradation value information of 9 values (4-bit data). However, information that the inkjet recording apparatus can actually record is only binary information indicating whether to record an ink or not. The dot layout pattern assignment processing serves to reduce the multivalued levels of 0 to 8 (4-bits) to binary levels determining whether to print a dot. More specifically, the dot layout pattern assignment unit 608 assigns a dot layout pattern corresponding to a gradation value (level 0 to 8) of a pixel to each pixel expressed by 4-bit data indicating the level 0 to 8, which is an output value from the halftoning unit 607. This assignment defines ON/OFF of a dot for each of a plurality of areas in one pixel, and sets 1-bit discharge data "1" or "0" to each area in one pixel.

Figure 10:
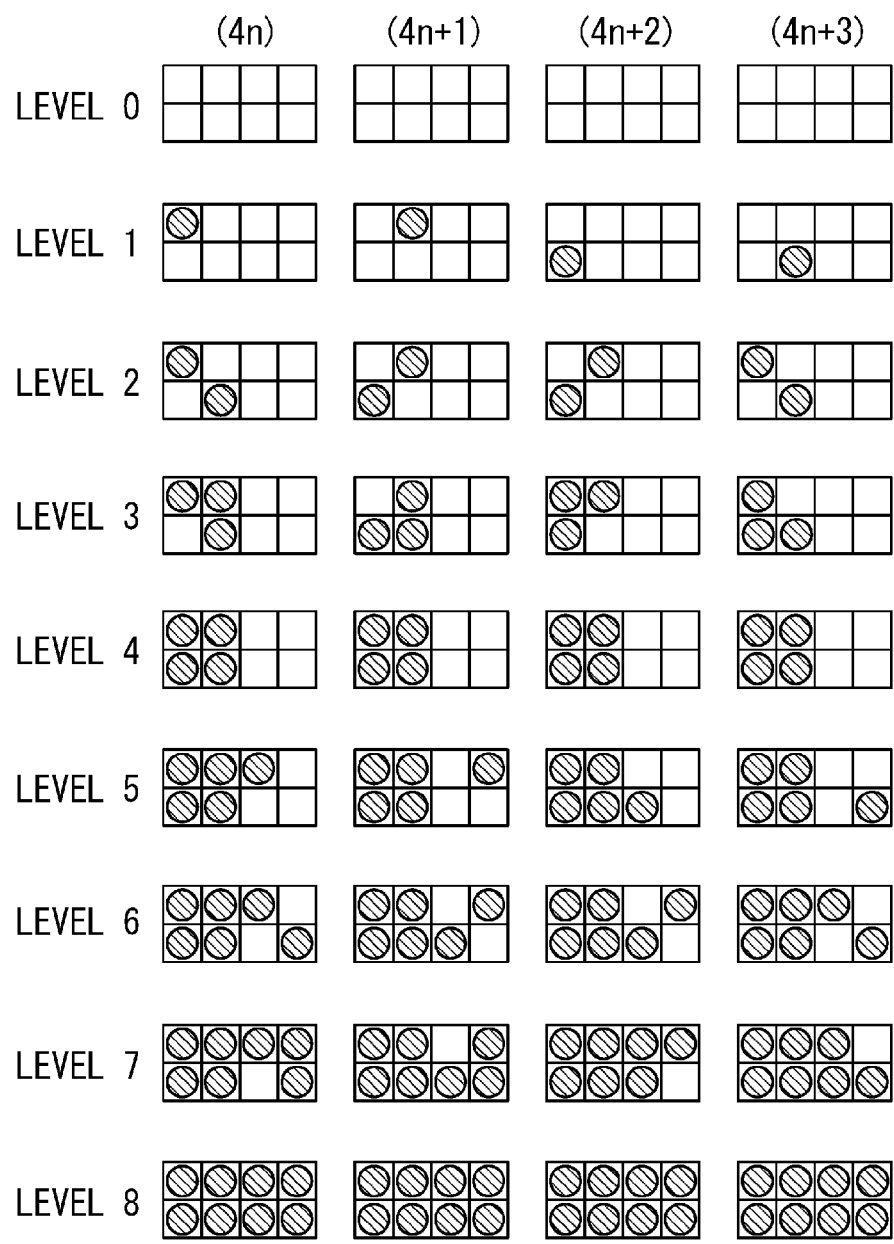
FIG. 10 illustrates dot layout pattern assignment processing according to the first exemplary embodiment.

FIG. 10 illustrates output patterns corresponding to the input levels 0 to 8, which are converted by the dot layout pattern assignment unit 608. The respective level values indicated on the left side of FIG. 10 correspond to the levels 0 to 8, each of which is an output value from the halftoning unit 607. Each of the matrix regions constituted by areas arranged in two rows and four columns, which are illustrated on the right side of FIG. 10, corresponds to a region of one pixel output by the halftoning processing. The areas in one pixel are the smallest unit to which ON/OFF of a dot is defined.

In FIG. 10, the areas with circles written therein are areas where a dot is recorded. As the level number is increased, the number of recorded dots is increased one by one. In this way, the density information of input image data is reflected to the output image data. The pixel position from the leftmost position in the horizontal direction in an input image is indicated by (4n) to (4n+3) in which one or a larger integer is substituted for "n". The respective patterns illustrated below the numbers (4n) to (4n+3) indicate that a plurality of different patterns is prepared for the same input level according to the pixel position. In other words, even if inputs of the same level are provided, four kinds of dot layout patterns illustrated below the numbers (4n) to (4n+3) are assigned thereto in turn on a recording medium.

In FIG. 10, the vertical direction represents the direction in which the discharge ports of the recording head are arranged, and the horizontal direction represents the scanning direction of the recording head. Therefore, this configuration, which enables even the same level to be recorded in various dot patterns as mentioned above, can bring about such an effect that the number of times of discharge is distributed between the nozzle positioned on the upper row of the dot layout pattern and the nozzle positioned on the lower row of the dot layout pattern, and thereby various noises specific to the printer can be distributed. The above-described dot layout pattern assignment unit 608 determines all of the dot layout patterns on a recording medium.

Figure 11:
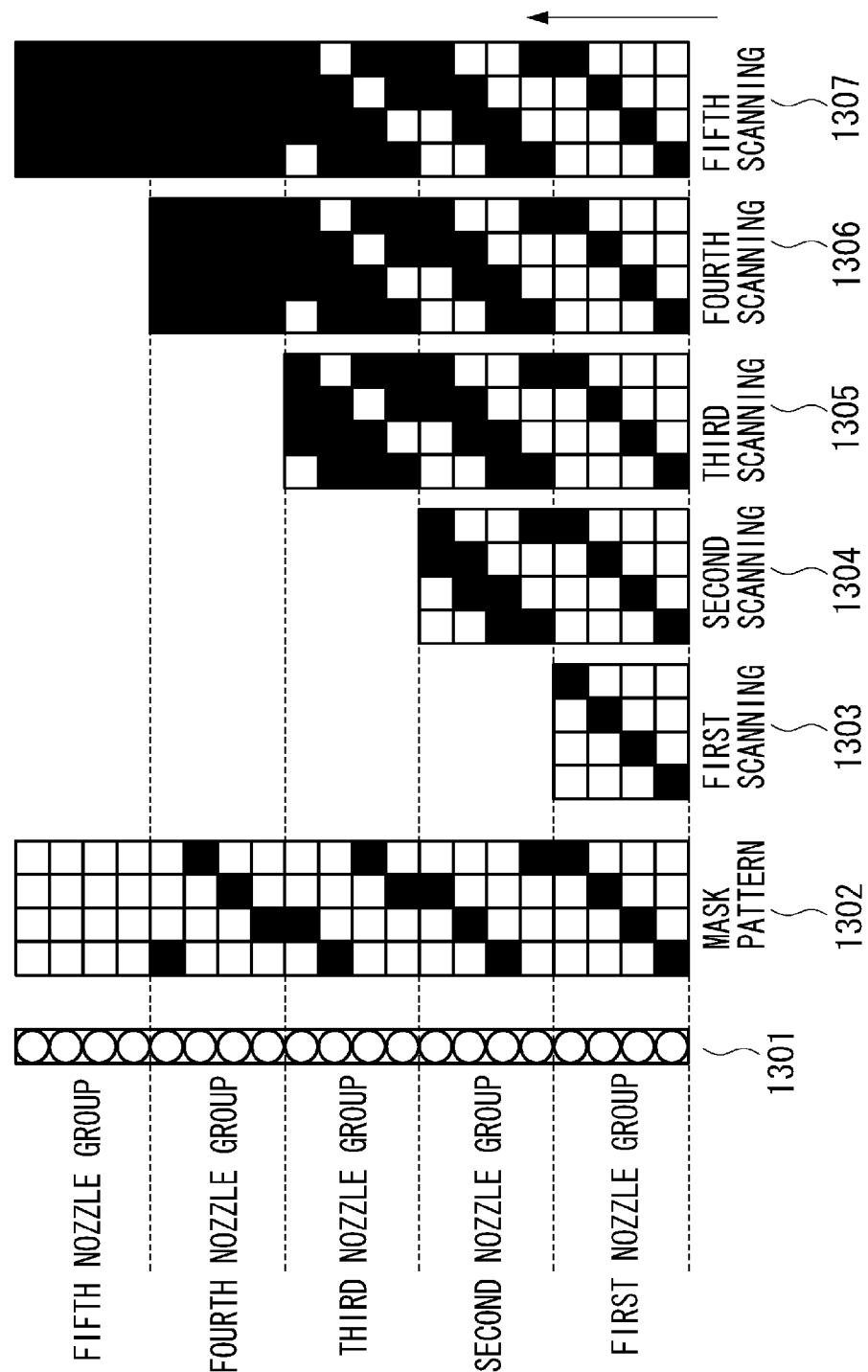
FIG. 11 illustrates a multipass recording method according to the first exemplary embodiment.

Next, the mask data conversion unit 609 will be described. FIG. 11 schematically illustrates the recording head as a color material recording unit, and a recording pattern thereof for facilitating better understanding of the multipass recording method. The recording head 1301 includes 20 nozzles which discharge ink dots. In the present exemplary embodiment, the recording head 1301 includes 20 nozzles for convenience of description, but the recording head 1301 may have any number of nozzles. As illustrated in FIG. 11, the nozzles are divided into five nozzle groups, the first nozzle group to the fifth nozzle group. Each nozzle group includes four nozzles. In a mask pattern 1302, the black blocks indicate areas to be recorded by the respective nozzles. The recording head 1301 is configured in such a manner that the patterns recorded by the respective nozzle groups are in a complementary relationship to one another, and overlaying these patterns results in completion of recording on a region corresponding to 4×4 areas.

The respective patterns 1303 to 1307 illustrate the process during which an image is being completed by repeating a recording scanning operation. Each time recording scanning of each nozzle group is completed, the recording medium is conveyed by a distance corresponding to the width of the nozzle group in the direction indicated by the arrow in FIG. 11. Therefore, execution of four times of recoding scanning among five times of recording scanning in total completes recording of an image on the same region (a region corresponding to the width of each nozzle group) of the recording medium. In this way, during recording of a chromatic ink, each same region of a recording medium is formed by a plurality of times of scanning performed by a plurality of nozzle groups.

Figure 12:
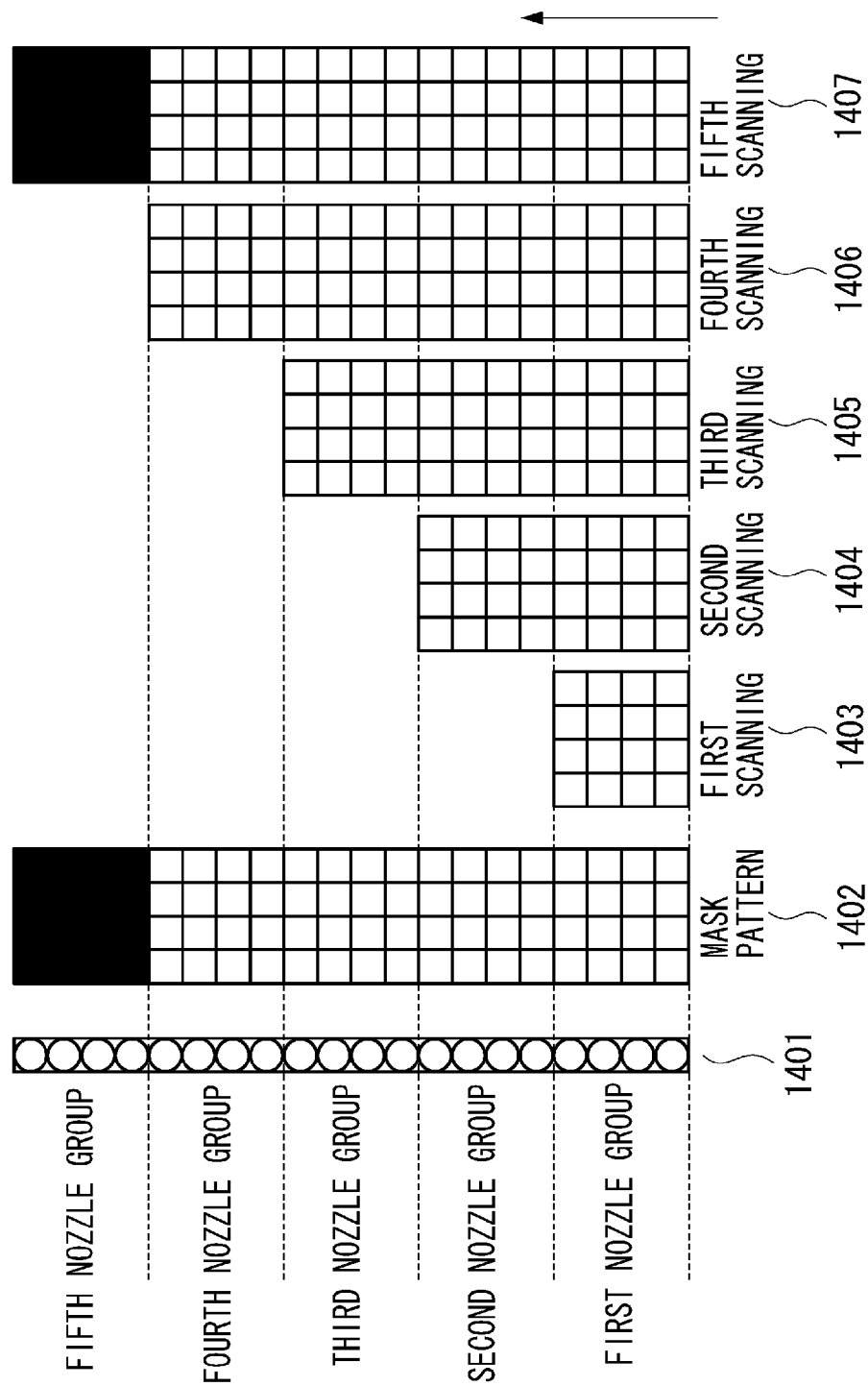
FIG. 12 illustrates a clear ink recording operation according to the first exemplary embodiment.

On the other hand, regarding recording of the clear ink, as illustrated in FIG. 12, the clear ink is recorded by using only the fifth nozzle group. In other words, an image of chromatic inks is formed by the first scanning (first nozzle group) to the fourth scanning (fourth nozzle group) of the recording head 1301, and the clear ink is discharged by the fifth scanning (fifth nozzle group). This recording method enables an image formed with chromatic inks to be overcoated with the clear ink while the ink amount of the clear ink is randomly changed.

The present exemplary embodiment has been described based on an example of overcoating an image with the clear ink by the multipass printing method. However, the method for overcoating an image with the clear ink is not limited thereto. For example, the single pass printing method can be also applied by configuring the recording head 1301 such that the nozzle array in charge of the clear ink is disposed at a position capable of performing scanning last in the sheet conveyance direction. Further, the application of the multipass printing method can be also realized by disposing the nozzle arrays of the clear ink at the respective ends of the recording head 1301, and switching the nozzle array for each scanning such that the clear ink is discharged last. Further, in the present exemplary embodiment, the nozzles of the recording head 1301 are divided into five groups for convenience of description, but the present invention is not limited thereto. For example, the nozzles may be divided into six groups.

The above-described processing may be carried out by the CPU according to the program, or may be carried out by, for example, a printer driver in the host (computer system 402).

In this way, according to the present exemplary embodiment, it is possible to reduce comprehensive coloring of specular reflection light by overcoating an image formed with chromatic inks with a clear ink layer having a randomly changed ink amount.

The first exemplary embodiment has been described based on such an example in which the maximum value of the clear ink amount, which is expressed by 8-bit data, is 255. A second exemplary embodiment of the present invention will be described as an example of changing the maximum value of the clear ink amount according to the coloring characteristic of the clear ink used as a coating.

Figure 1:
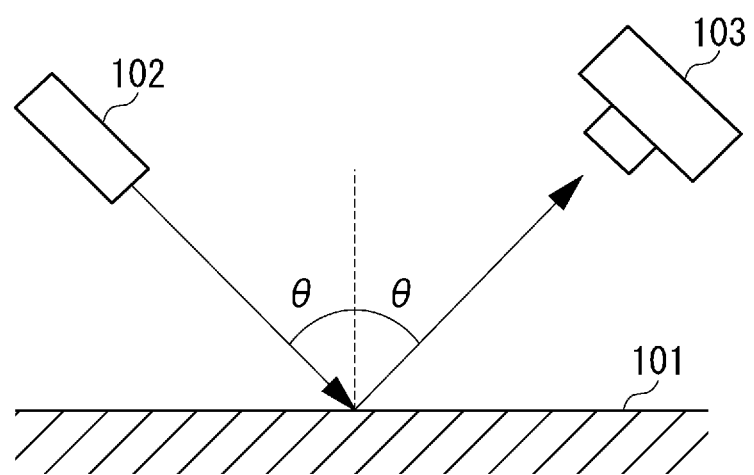
FIG. 1 illustrates a method for evaluating coloring of specular reflection light.
Figure 2:
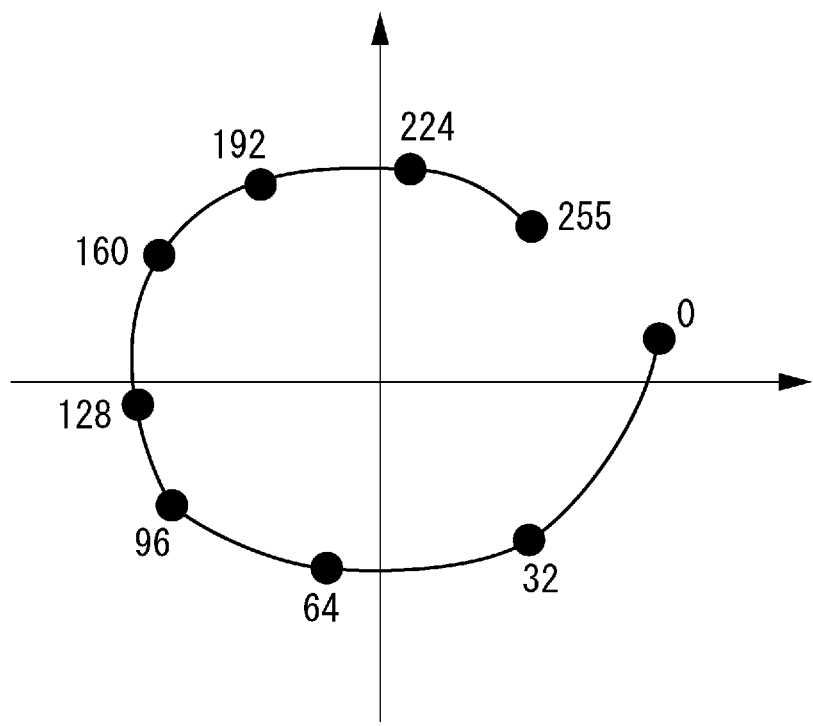
FIG. 2 illustrates an example of evaluation of coloring of specular reflection light when an achromatic color material is applied on a solid surface of a cyan ink while the amount of the achromatic color material is changed.
Figure 13A:
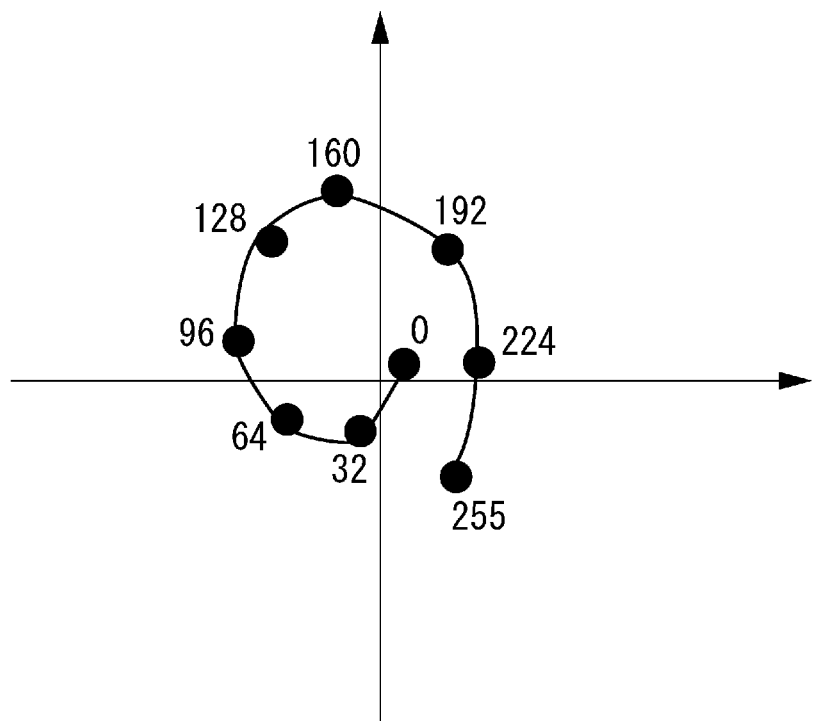
FIG. 13A illustrates an example of coloring of specular reflection light when a clear ink is discharged onto a recording medium according to a second exemplary embodiment of the present invention.
Figure 13B:
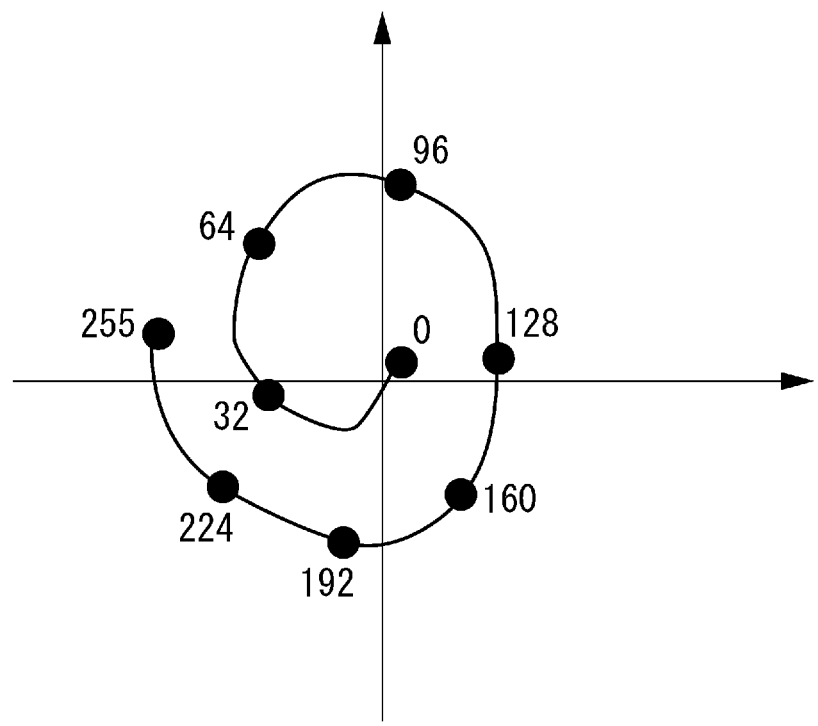
FIG. 13B illustrates an example of coloring of specular reflection light when a clear ink is discharged onto a recording medium according to the second exemplary embodiment.

FIGS. 13A and 13B are graphs each constructed by plotting, on the a*b* plane, a change in coloring of specular reflection light when the clear ink is recorded on a recording medium while the ink amount thereof is changed. FIGS. 13A and 13B illustrate the changes when a patch image is recorded with use of different kinds of clear inks, and the coloring of specular reflection light at that time is measured by the method discussed in Japanese Patent Application Laid-Open No. 2006-177797. The numerical values in FIGS. 13A and 13B each indicate a clear ink value, as is the case with the numerical values in FIG. 2. These graphs show that the change in the coloring illustrated in FIG. 13B is larger than the change in the coloring illustrated in FIG. 13A. Setting ink amounts so that the hues of local coloring corresponding to the respective ink amounts form a whole circle (360 degrees) on the hue circle is enough to make coloring of specular reflection light achromatic with use of the additive color mixing method. In sum, in FIG. 13A, the maximum value of the clear ink amount can be set to 224. Therefore, the achromatic color material amount determination processing is expressed by the following equation.

Clear_Ink_Vol=(int)(RAND( )/RAND_MAX*224.0) (processing 2)

In this equation, "Clear_Ink_Vol" represents a clear ink amount for each pixel, "RAND( )" represents a natural random number, and "RAND_MAX" represents the maximum number of random numbers.

On the other hand, in FIG. 13B, the maximum number of the clear ink amount can be set to 128. Therefore, in this case, the achromatic color material amount determination processing expressed by the above-described processing 2 is changed to the following equation.

Clear_Ink_Vol=(int)(RAND( )RAND_MAX*128.0) (processing 3)

In this way, it is possible to reduce the consumed amount of the clear ink while reducing coloring of specular reflection light by changing the processing according to the coloring characteristic of the clear ink used as a coating.

The first and second exemplary embodiments have been described based on the method of providing the printer with the random number generation unit, and thereby overcoating an image, which is formed with chromatic inks, with a clear ink layer having a randomly changing ink amount. A third exemplary embodiment of the present invention will be described as an example of using a pattern of an arbitrary number of pixels such as 300 pixels×300 pixels, although the number of pixels is certainly not limited thereto.

More specifically, a pattern of an arbitrary number of pixels is stored in the printer in advance, and the pattern is arranged vertically and horizontally, like laying tiles, according to the size of an input image, whereby an image formed with chromatic inks is overcoated with the pattern of the achromatic color material (clear ink).

Figure 14:
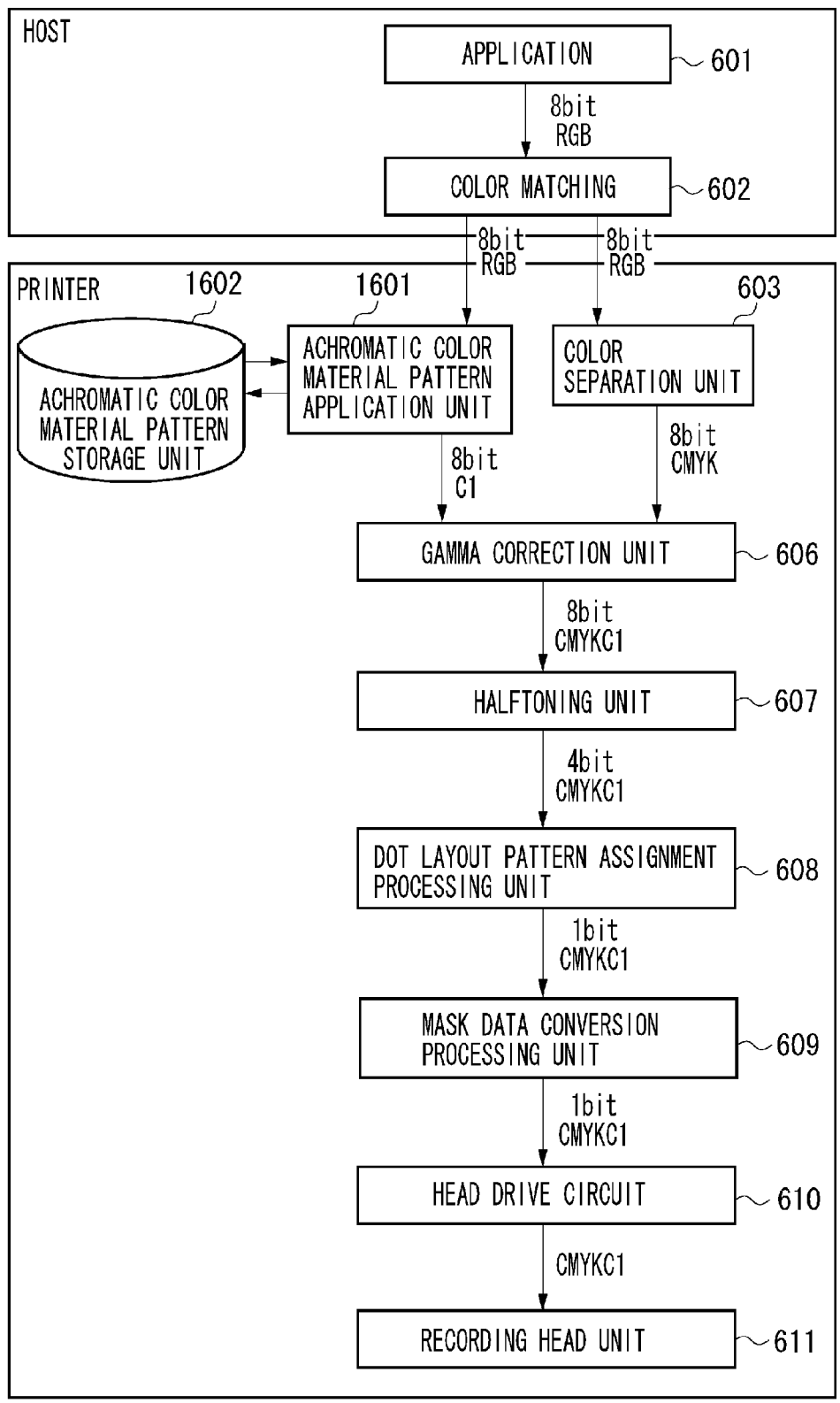
FIG. 14 illustrates a configuration of a recording data generation system according to a third exemplary embodiment of the present invention.

FIG. 14 illustrates a configuration of a recording data generation system according to the present exemplary embodiment. The configuration illustrated in FIG. 14 includes an achromatic color material pattern application unit 1601 and an achromatic color material pattern storage unit 1602 instead of the achromatic color material amount determination unit 604 and the random number generation unit 605 in the configuration illustrated in FIG. 6. The other units are the same as those illustrated in FIG. 6, and therefore will not be described repeatedly.

The achromatic color material pattern application unit 1601 retrieves a pattern stored in the achromatic color material patter storage unit 1602 to input it. The pattern stored in the achromatic color material patter storage unit 1602 is a pattern of 300 pixels×300 pixels, and defines a clear ink amount for each pixel.

A method for generating this pattern will be described. This pattern can prevent occurrence of a bronzing phenomenon and a thin-film interference phenomenon, and is constituted by only the clear ink. More specifically, this pattern has an image size of 300 pixels×300 pixels, and is prepared in advance by generating random numbers described in the description of the first or second exemplary embodiment.

Figure 15:
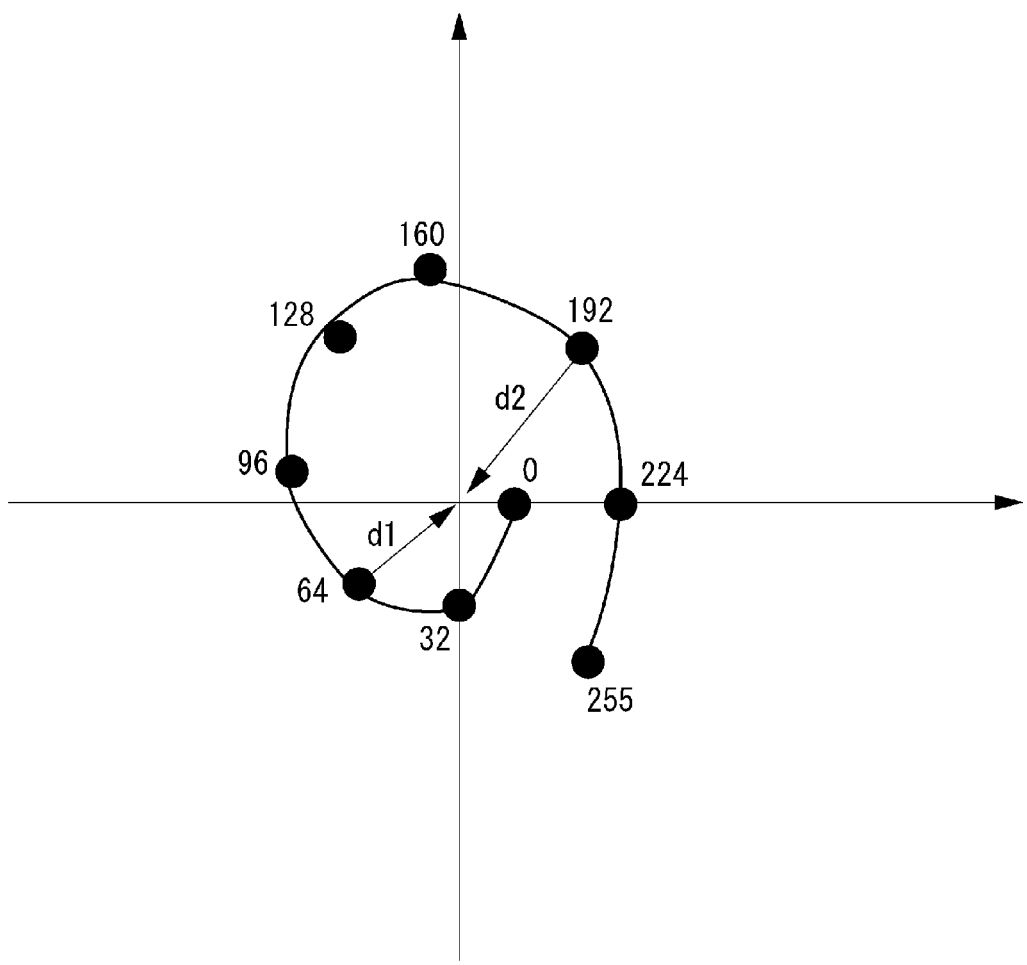
FIG. 15 is a graph in which coloring of specular reflection light according to the third exemplary embodiment is plotted.

As another generation method, the pattern may be generated based on coloring obtained with use of the measurement method discussed in Japanese Patent Application Laid-Open No. 2006-177797. FIG. 15 is a graph constructed by recording a patch image while changing the clear ink amount, measuring coloring of specular reflection light at this time by the measurement method discussed in Japanese Patent Application Laid-Open No. 2006-177797, and then plotting the results on the a*b* plane. It is possible to approach comprehensive coloring to the original point (make coloring achromatic) by using the measurement results to, for example, add coloring A(a*, b*) at the point A of clear ink amount 64 and coloring B(a*, b*) at the point B of clear ink amount 192 according to the respective distances d1 and d2 from the original point, as the following processing.

$$A(a^*, b^*)^*(d2/(d1+d2))+B(a^*, b^*)^*(d1/(d1+d2)) \quad \text{(processing 4)}$$

Therefore, the pattern is formed so as to realize such an arrangement that the area ratio of dots indicating the respective clear ink amounts in the image size of 300 pixels×300 pixels corresponds to the ratio of the distances d1 and d2 which indicate the degree of the coloring thereof. It is effective to form this pattern as a pattern which generates color material data corresponding to the color material amount of the achromatic color material for a pixel of interest in such a manner that the color material amount of the achromatic color material for the pixel of interest is different from the color material amount of the achromatic color material for a pixel adjacent to the pixel of interest. Comprehensive coloring can be reduced on the thus-generated pattern. This generated pattern is referred to as "complementary pattern", since this pattern is generated such that colors in a complementary color relationship indicating opposite colors from each other are used to cancel out the respective coloring.

The achromatic color material pattern application unit 1601 determines the clear ink amount for each pixel by repeatedly arranging the complementary color pattern of 300 pixels×300 pixels, which is generated as mentioned above, vertically and horizontally like laying tiles, according to the size of the input image.

Figure 16:
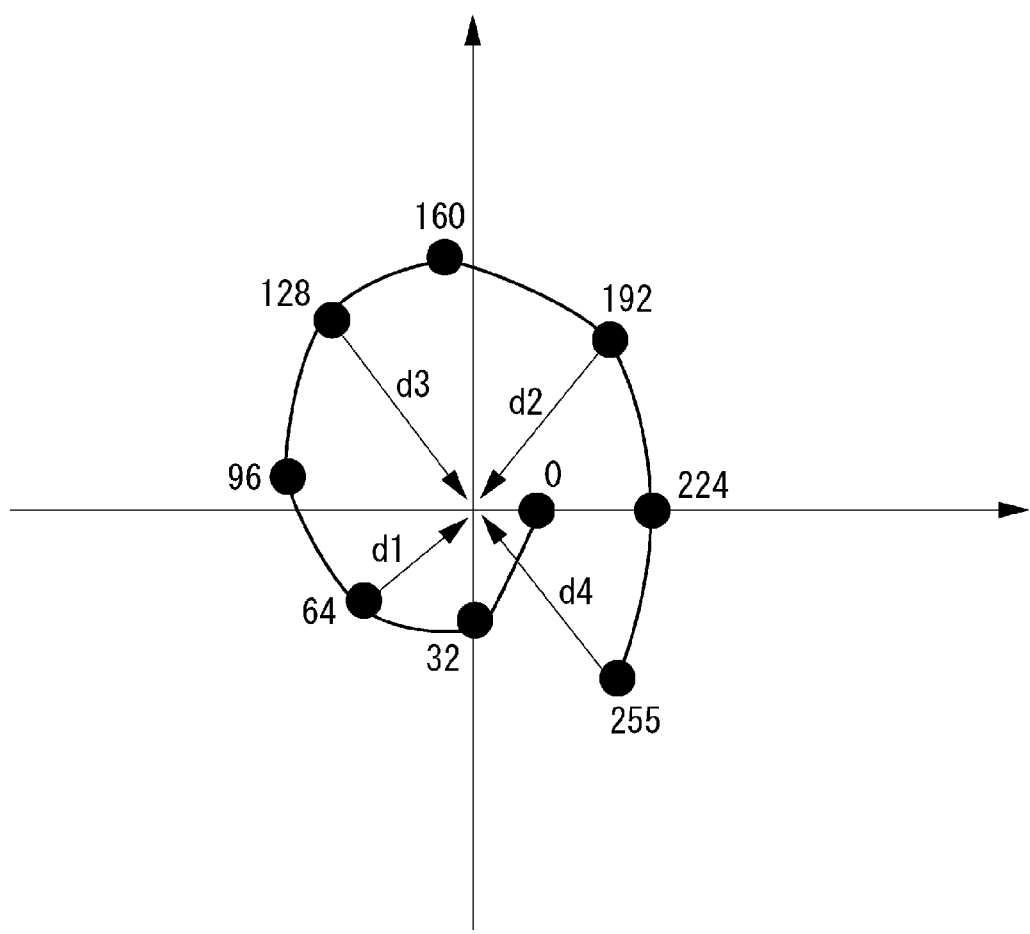
FIG. 16 illustrates an example of pattern generation according to the third exemplary embodiment.

Alternatively, as another generation method, the achromatic color material pattern application unit 1601 may determine the clear ink amount with use of a pattern based on output values resulting from specific frequency modulation such as commonly known Bayer-type mask, white-noise mask, blue-noise mask, and green-noise mask. The pattern may be generated by using four points as illustrated in FIG. 16, instead of the above-mentioned two points, or may be generated by using any number of points. In this way, it is possible to determine the clear ink amount so as to comprehensively reduce coloring with the simplified configuration.

The methods according to the first to third exemplary embodiments do not take into consideration a color material allowable amount, which is a limit value for a total use amount of color materials that an image recording medium can absorb. A fourth exemplary embodiment of the present invention will be described as an example of determining the clear ink amount while satisfying the color material allowable amount.

Figure 17:
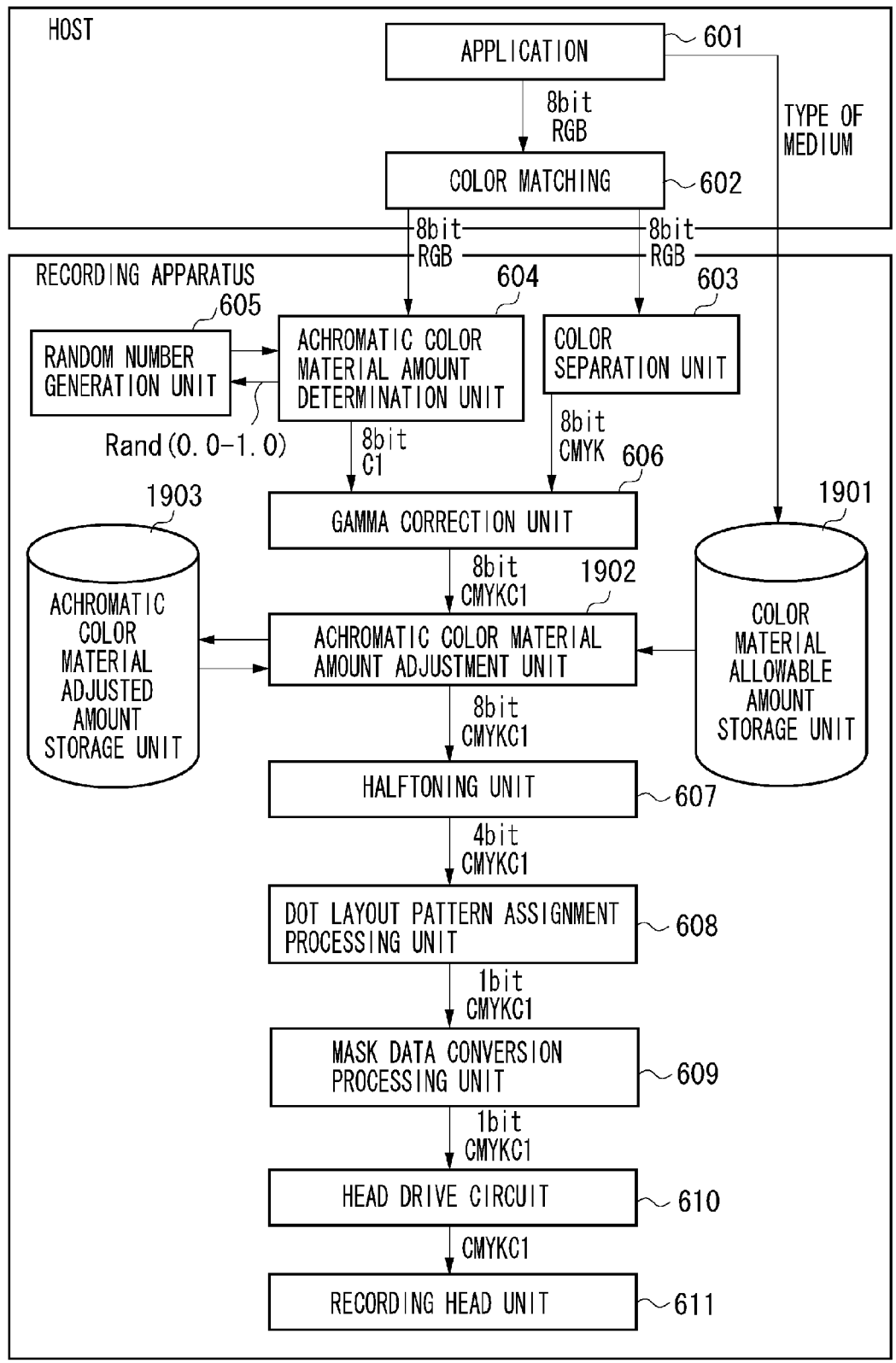
FIG. 17 illustrates an apparatus configuration of a recording data generation system according to a fourth exemplary embodiment of the present invention.

FIG. 17 illustrates an apparatus configuration of a recording data generation system according to the present exemplary embodiment. The configuration illustrated in FIG. 17 includes a color material allowable amount storage unit 1901, an achromatic color material amount adjustment unit 1902, and an achromatic color material adjusted amount storage unit 1903, in addition to the configuration illustrated in FIG. 6.

The color material allowable amount storage unit 1901 stores a color material allowable amount of each recording medium. The achromatic color material amount adjustment unit 1902 inputs the type of a recording medium that is the recording target set by the application 601. The achromatic color material amount adjustment unit 1902 acquires the color material allowable amount corresponding to the input type of the recording medium from the color material allowable amount storage unit 1901. Further, the achromatic color material amount adjustment unit 1902 inputs a CMYK signal from the gamma correction unit 606, and calculates a total amount of chromatic color materials. The achromatic color material amount adjustment unit 1902 calculates the maximum amount indicating how much clear ink is allowed to be discharged by subtracting the calculated total amount from the acquired color material absorption allowable amount. Then, the achromatic color material amount adjustment unit 1902 determines whether the clear ink amount input from the gamma correction unit 606 exceeds the calculated maximum amount (i.e., whether the sum of the total amount of chromatic color materials and the input discharge amount of the clear ink exceeds the color material absorption allowable amount). If the input clear ink amount exceeds the calculated maximum amount, the achromatic color material amount adjustment unit 1902 corrects the input clear ink amount to fall below the maximum value.

Figure 18A:
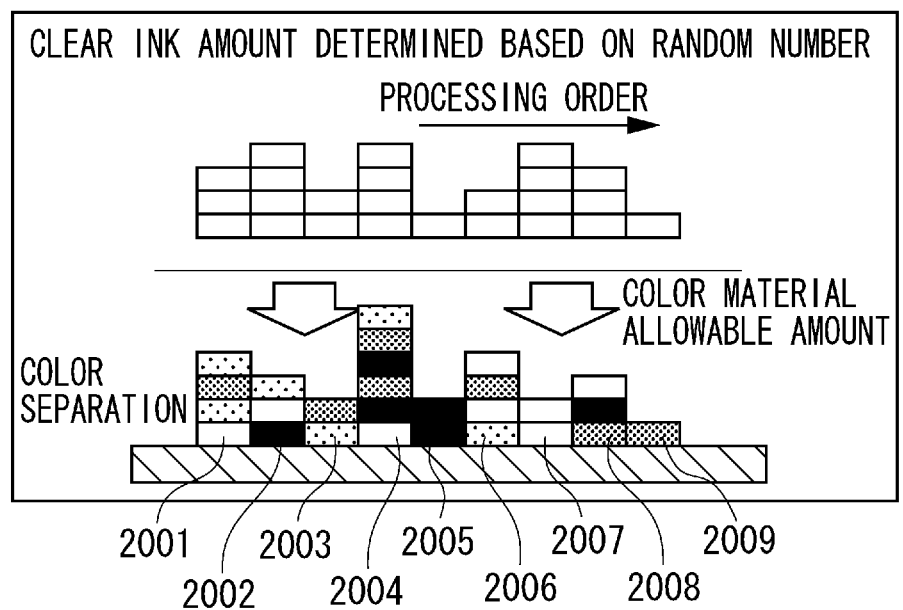
FIG. 18A illustrates a cross section of an arbitrary image on a recording medium according to the fourth exemplary embodiment.
Figure 18B:
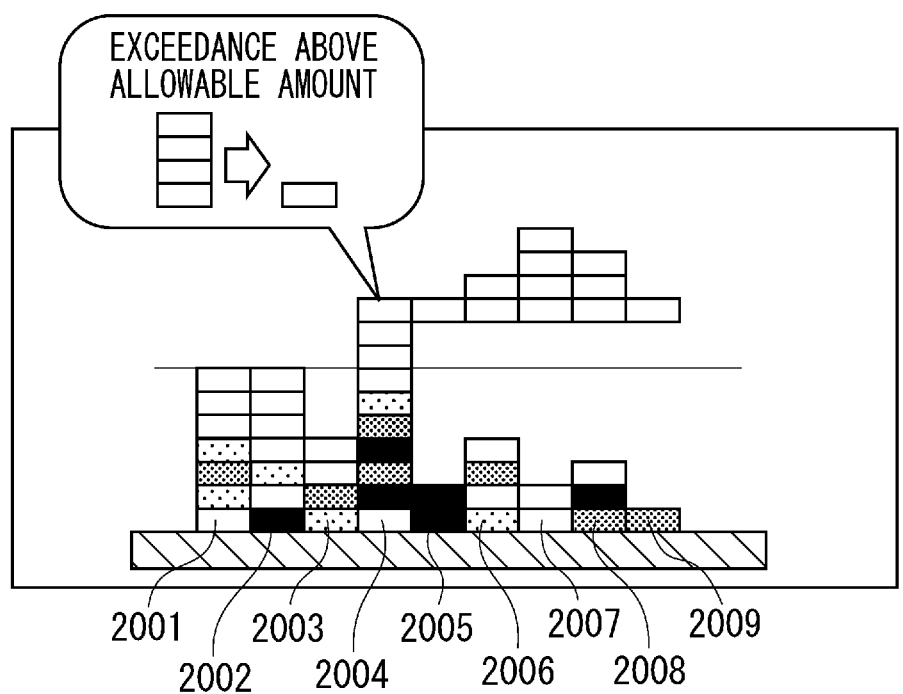
FIG. 18B illustrates a cross section of an arbitrary image on a recording medium according to the fourth exemplary embodiment.
Figure 18C:
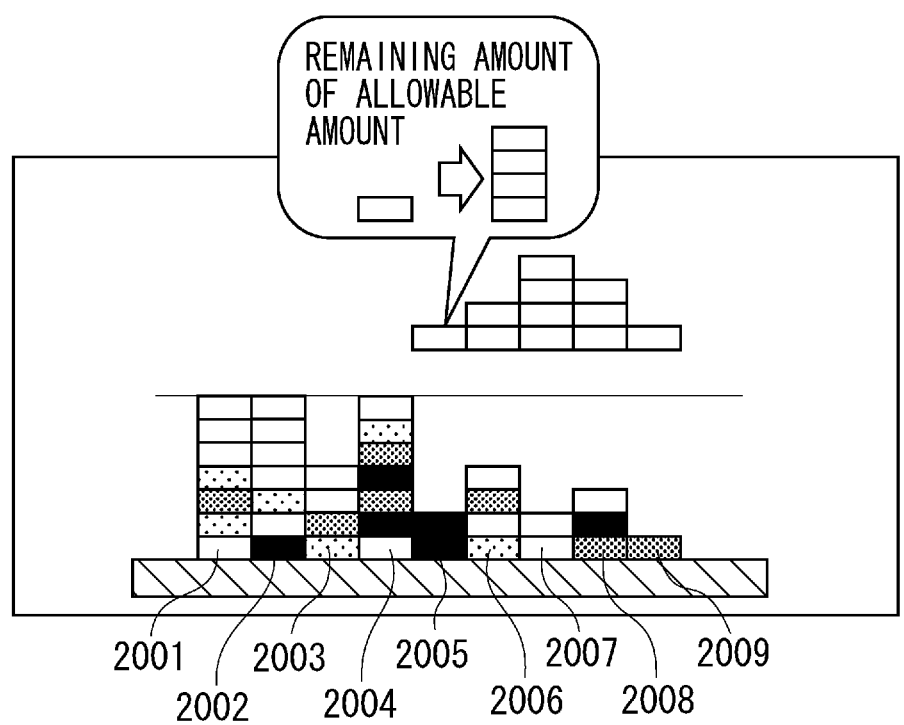
FIG. 18C illustrates a cross section of an arbitrary image on a recording medium according to the fourth exemplary embodiment.

Further, as another method, an example including the achromatic color material adjusted amount storage unit 1903, in addition to the above-described configuration, will be described with reference to FIGS. 18A to 18C. FIGS. 18A and 18C illustrate cross-sections of pixels 2001 to 2009 in an arbitrary image on a recording medium. FIGS. 18A to 18C schematically illustrate how the processing progresses.

The processing progresses in the order of FIG. 18A->FIG. 18B->FIG. 18C.

FIG. 18A illustrates that the chromatic inks determined by the color separation unit 603 are discharged onto a recording medium, and the clear ink determined by the achromatic color material amount determination unit 604 is overlaid thereon. Further, FIG. 18A also indicates the color material allowable amount stored in the color material allowable amount storage unit 1901. The respective blocks in FIG. 18A represent color materials, and how many blocks are stacked indicates how much color material is laid.

FIG. 18B illustrates that the sum of the chromatic color material amount and the clear ink amount exceeds the color material allowable amount at the pixel 2004. At this time, as mentioned above, the achromatic color material amount adjustment unit 1902 performs the processing of correcting the clear ink amount so that the sum of the chromatic color material amount and the clear ink amount falls below the color material allowable amount, and further, stores the correction amount indicating that the clear ink amount corresponding to four blocks, by which the sum exceeds the color material allowable amount, is corrected to the amount corresponding to one block, in the achromatic color material adjusted amount storage unit 1903. Further, the achromatic color material amount adjustment unit 1902 continues the processing while searing for a pixel that can accept a reverse correction of the correction stored in the achromatic color material adjusted amount storage unit 1903, i.e., such a correction that the clear ink amount corresponding to one block is corrected to the amount corresponding to four blocks, with use of the sum of the chromatic color material amount and the achromatic color material amount.

FIG. 18C illustrates that the achromatic color material amount adjustment unit 1902 finds a pixel that can accept such a correction that the clear ink amount corresponding to one block is corrected to the clear ink amount corresponding to four blocks. The achromatic color material amount adjustment unit 1902 deletes the correction amount from the achromatic color material adjusted amount storage unit 1903.

The achromatic color material adjusted amount storage unit 1903 has a memory capable of storing the correction amounts of the achromatic color material amount for pixels of an input image at most. Further, the achromatic color material adjusted amount storage unit 1903 may store only a difference of the clear ink amount adjusted by the achromatic color material amount adjustment unit 1902. In this case, the achromatic color material amount adjustment unit 1902 searches for a pixel to which the difference can be applied, and applies the difference after finding it.

Further, the present invention can be also embodied by providing a system or an apparatus with a storage medium storing program code of software capable of realizing the functions (for example, the function indicated in the above-described flowchart) of the above-described exemplary embodiments. In this case, a computer (or a CPU or a micro processing unit (MPU)) of the system or the apparatus reads out and executes the program code that is stored in the storage medium in a computer readable manner, thereby realizing the functions of the above-described exemplary embodiments.

In this way, it is possible to determine the clear ink amount capable of comprehensively reducing coloring while satisfying the color material allowable amount.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-235561 filed Oct. 20, 2010, which is hereby incorporated by reference herein in its entirety.

The invention claimed is:

1. An image processing apparatus comprising:
conversion means configured to convert image data corresponding to a pixel of interest in an image into color material data corresponding to a color material amount of a chromatic color material;
generation means configured to generate color material data corresponding to a color material amount of an achromatic color material at the pixel of interest in such a manner that the color material data corresponding to the color material amount of the achromatic color material at the pixel of interest is different from color material data corresponding to a color material amount of the achromatic color material at a pixel adjacent to the pixel of interest; and
random number generation means configured to generate a random number,
wherein the generation means generates the color material data corresponding to the color material amount of the achromatic color material at the pixel of interest based on the random number.

2. An image processing apparatus comprising:
conversion means configured to convert image data corresponding to a pixel of interest in an image into color material data corresponding to a color material amount of a chromatic color material;
generation means configured to generate color material data corresponding to a color material amount of an achromatic color material at the pixel of interest in such a manner that the color material data corresponding to the color material amount of the achromatic color material at the pixel of interest is different from color material data corresponding to a color material amount of the achromatic color material at a pixel adjacent to the pixel of interest; and
input means configured to input an achromatic color material pattern including a plurality of pieces of color material data respectively corresponding to a plurality of different color material amounts of the achromatic color material,
wherein the generation means generates the color material data corresponding to the color material amount of the achromatic color material at the pixel of interest based on the achromatic color material pattern.

3. The image processing apparatus according to claim 2, wherein the achromatic color material pattern is such a combination that coloring phenomena of specular reflection light on a recording medium, which respectively result from the plurality of different color material amounts of the achromatic color material, cancel out each other.

4. The image processing apparatus according to claim 2, wherein the achromatic color material pattern is a pattern arranged according to a ratio of degrees of the coloring phenomena of specular reflection light on the recording medium, which respectively result from the plurality of different color material amounts of the achromatic color material.

5. The image processing apparatus according to claim 2, wherein the achromatic color material pattern is a pattern based on a value from application of predetermined frequency modulation to the plurality of pieces of color material data respectively corresponding to the plurality of different color material amounts of the achromatic color material.

6. The image processing apparatus according to claim 1, further comprising:
quantization means configured to quantize the generated color material data into multivalued data; and
assignment means configured to assign a dot layout pattern on a recording medium to the multivalued data.

7. The image processing apparatus according to claim 1, wherein the color material data corresponding to the color material amount of the achromatic color material is color material data corresponding to such a color material amount that hues of coloring phenomena of specular reflection light on a recording medium, which result from a plurality of different color material amounts of the achromatic color material, are located within a range of 360 degrees on a hue circle.

8. The image processing apparatus according to claim 1, further comprising:
acquisition means configured to acquire a limit value of a total color material use amount; and
correction means configured to correct the generated color material data in such a manner that, in a case where a sum of the color material amount corresponding to the converted color material data and the color material amount corresponding to the generated color material data exceeds the limit value, the sum is reduced so as not to exceed the limit value.

9. The image processing apparatus according to claim 8, further comprising:
holding means configured to hold a correction amount corrected by the correction means; and addition means configured to add the correction amount to the generated color material data in a case where the correction amount and the sum do not exceed the limit value.

10. An image processing method comprising:

converting image data corresponding to a pixel of interest in an image into color material data corresponding to a color material amount of a chromatic color material;

generating color material data corresponding to a color material amount of an achromatic color material at the pixel of interest in such a manner that the color material data corresponding to the color material amount of the achromatic color material at the pixel of interest is different from color material data corresponding to a color material amount of the achromatic color material at a pixel adjacent to the pixel of interest; and generating a random number, wherein the color material data corresponding to the color material amount of the achromatic color material at the pixel of interest is generated based on the random number.

11. The image processing apparatus according to claim 3, wherein the achromatic color material pattern is a pattern arranged according to a ratio of degrees of the coloring phenomena of specular reflection light on the recording medium, which respectively result from the plurality of different color material amounts of the achromatic color material.

12. The image processing apparatus according to claim 1, wherein the achromatic color material is a clear material.

13. The image processing apparatus according to claim 2, wherein the achromatic color material is a clear material.

* * * * *